Figure 1:
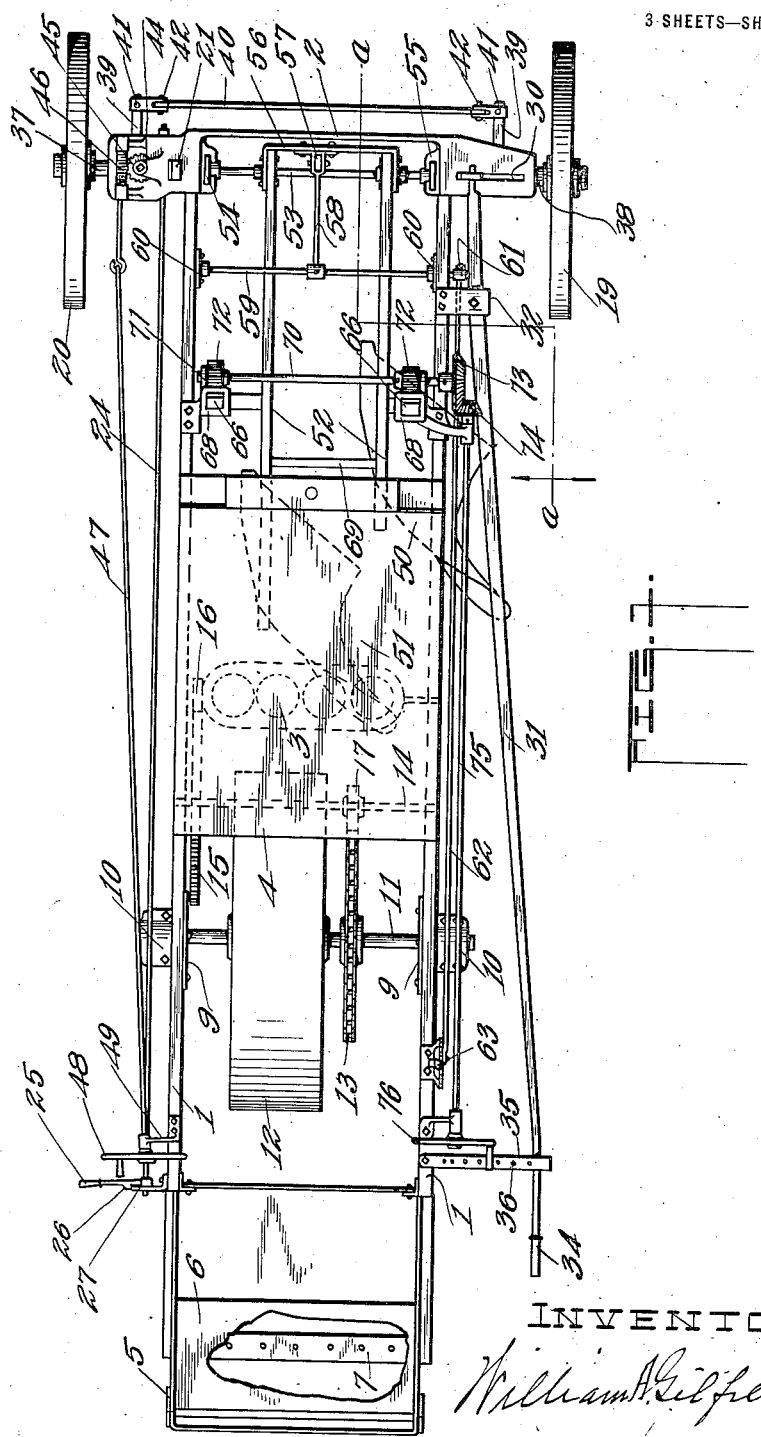

W. A. GILFILLAN.
TRACTOR PLOW.
APPLICATION FILED NOV. 12, 1917.

1,319,063.

Patented Oct. 21, 1919.
3 SHEETS—SHEET 1.

INVENTOR.
William A. Gilfillan
By W. V. Tifft
ATT'Y

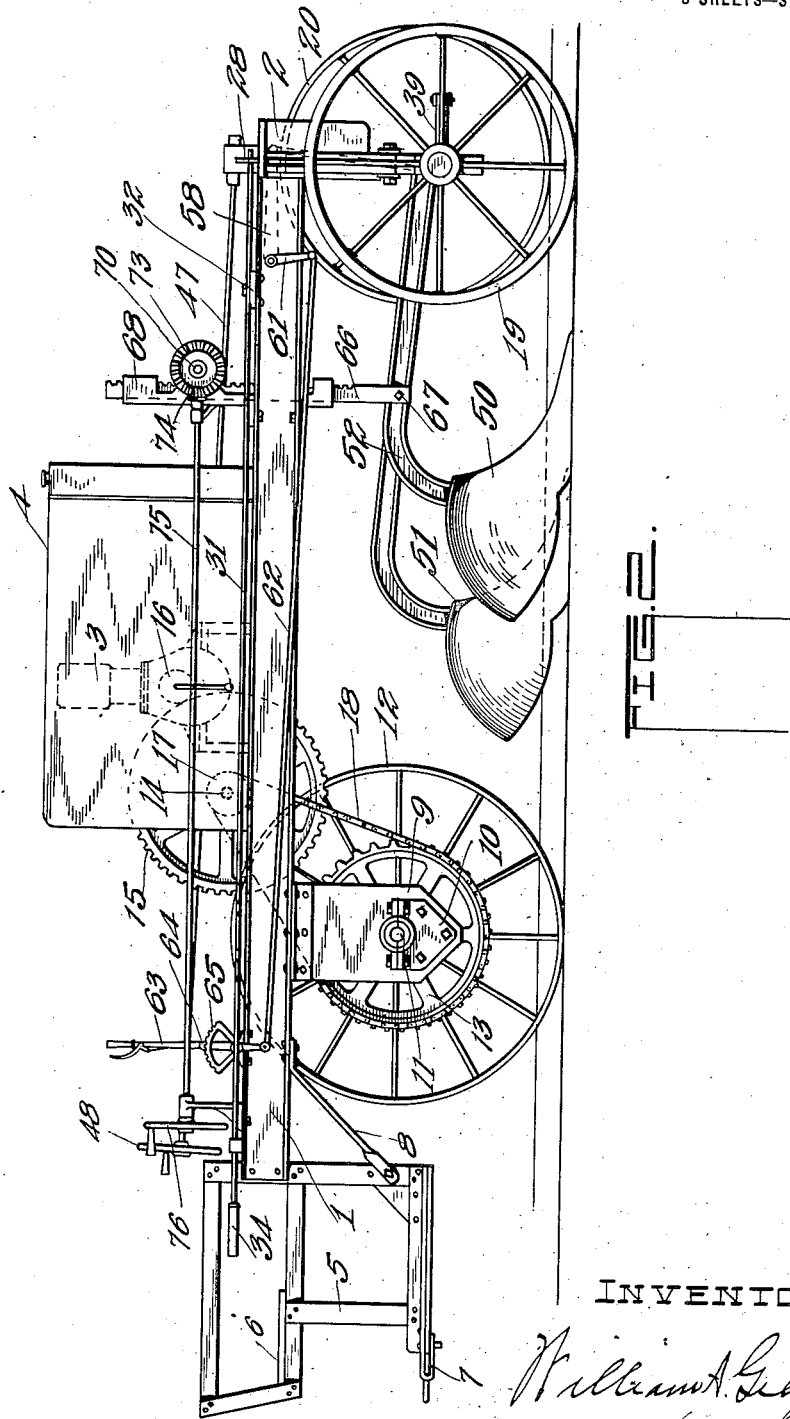

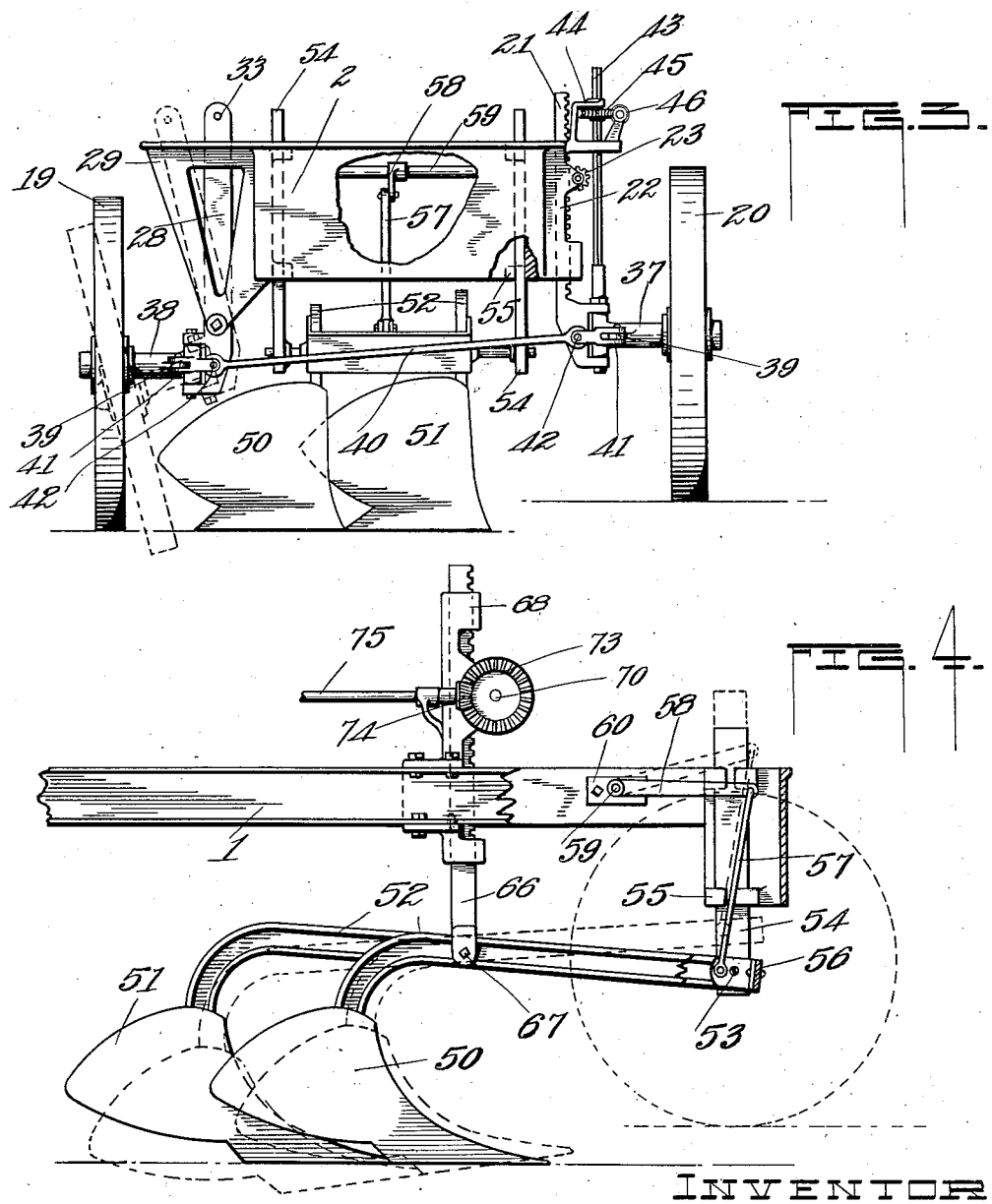

UNITED STATES PATENT OFFICE.

WILLIAM A. GILFILLAN, OF CHILLICOTHE, ILLINOIS.

TRACTOR-PLOW.

1,319,063.         Specification of Letters Patent.     Patented Oct. 21, 1919.

Application filed November 12, 1917. Serial No. 201,708.

*To all whom it may concern:*

Be it known that I, WILLIAM A. GILFILLAN, a citizen of the United States, residing at Chillicothe, in the county of Peoria and State of Illinois, have invented certain new and useful Improvements in Tractor-Plows, of which the following is a specification.

This invention has reference more particularly to tractor plows in which the plows are supported from the frame of the tractor and positioned so that the plows automatically hold a guiding wheel of the machine against the side of the furrow and thereby serve to regulate the distance at which the plows operate from the edge of the furrow previously made.

The object of the invention is to provide a tractor plow of simple form and inexpensive to construct, which is capable of convenient adjustment to meet the requirements of plowing.

A further object is to provide means whereby the tractor may be adjusted so that it will follow the furrow previously made and thereby insure the plows operating at a uniform distance from the furrow previously made.

A further object is to provide a guiding wheel for the tractor which may be set so that it will automatically hug the furrow previously made and thereby render it unnecessary for the operator to give continuous attention to the steering of the device.

A further object is to provide a tractor plow wherein the plows are readily removable and the tractor otherwise constructed so that it may be used for pulling or other purposes without interference from the plows.

A further object is to provide a tractor plow having a drive wheel, having a wheel traveling in a new furrow and a wheel traveling in the old furrow previously made, and the plows positioned intermediate of the said wheels and arranged so that the lateral strain of the plows in passing through the ground will cause the said wheels to hug the vertical wall of the furrow.

This invention has other objects which will appear from the following specification in connection with the accompanying drawings and which are particularly pointed out in the claims.

In the drawings, Figure 1 is a top view of the complete machine; Fig. 2, a view taken from the right hand side of the machine; Fig. 3, a front view of the machine, portions thereof being broken away to show details of construction; and Fig. 4, a sectional view of a forward portion of the machine taken substantially on the line *a—a*, of Fig. 1.

The frame of the machine comprises a pair of spaced longitudinal sills 1, suitably connected at their forward ends by a crossplate 2, and suitably connected at their rear ends by a cross member not shown. Mounted upon the sills at a point about midway of the length of the frame is a motor shown by the dotted lines at 3, which may be provided with a suitable housing or cover 4, these said parts being positioned in such a manner to balance the weight of the machine so that the rear wheel will be held firmly out of the ground and so that the front wheels will be held down and prevented from climbing out of the furrow. At the rear end of the frame members 1, there is a frame structure 5, provided with a seat 6, for the operator, and provided with a draw bar 7, rigidly connected with the frame of the machine and strengthened by means of braces 8, so that it is capable of pulling heavy loads.

Depending from the frame members, adjacent the rear ends are the brackets 9, provided with bearings 10, in which is mounted the rear axle or shaft 11, upon which a single drive wheel 12 is mounted, the said drive wheel being positioned so as to travel in the inside furrow made by the plows which are positioned forwardly thereof as hereinafter more particularly noted.

Suitable gearing is provided for driving the traction wheel 12, from the motor 3, which may consist of a sprocket 13, fixed upon the shaft 11, to which the traction wheel 12 is likewise secured so that the turning of the sprocket 13 imparts motion to the wheel 12. A counter-shaft 14, may be located intermediate of the motor 3 and the rear drive shaft 11, and provided with a large gear wheel 15, meshing with a small pinion 16, on the motor or transmission shaft and a small sprocket 17, on the shaft 14 transmits power from the shaft 14 by means of chain 18 to the rear drive shaft.

It is to be understood that in connection with the power supplying devices, it is necessary to provide the usual transmission mechanism and means for controlling the application of power and changes in the mechanism just described for transmitting power to the drive shaft may be made without departing from the spirit of my invention, it being intended herein to show merely that suitable driving devices are provided to transmit power from the motor to the tractor wheel 12.

At the forward end of the tractor frame is a pair of supporting wheels 19 and 20, which are adjustable so that the tractor may be used to travel over ordinary smooth surfaces or relative positions of the wheels may be altered to meet the conditions of plowing. In the latter use the left hand wheel 20, is intended to travel on the unplowed ground and the right hand wheel 19 is intended to travel in the furrow made previously. The bottom of the furrow in which the wheel 19 travels is considerably below the surface of the ground and for the purpose of providing adjustment for maintaining the machine in a level position, when so operated, the left hand wheel 20, is secured to the lower end of the rack 21, which is movable vertically in a guideway 22, formed at the end of the cross plate 2, and there is a pinion 23 journaled in bearings adjacent and in mesh with the rack 21, the said rack being connected by means of the shaft 24 to a lever 25, at the rear of the machine, adjacent the operator's seat, the said lever 25 being provided with a suitable hand latch coöperating with a hand latch 26, coöperating with a notch segment 27, whereby the lever 25 may be adjusted to raise and lower the wheel 20 and hold it in the desired position.

The wheel 19 is mounted on the lower end of a bell crank 28, which is pivotally mounted adjacent the intersection at arms of the lever, on an axis parallel with the length of the machine in a bracket 29 at the end of the cross plate 2.

This construction provides for a tilting or inclination of the wheel 19, so that it will roll readily in the furrow and against the wall of the furrow. The upright arm of the bell-crank 28, extends above the frame of the machine through a slot 30, formed in the upper end of the bracket 29, which said slot limits the lateral movement of the lever 28, and accordingly the tilting of the wheel 19, and there is a long lever 31 pivoted in a bracket 32, adjacent the forward end of the machine, the forward end of which said lever passes through an opening 33, in the upper end of the arm of the bell crank 28. This lever 31 extends rearwardly to a point adjacent the operator's seat and is there provided with a handle 34, whereby the lever may be operated to control the tilting of the wheel 19, and there is a slotted guide 35, through which the lever 31 is passed which may be provided with holes 36, through which a pin may be passed to engage the lever 31, and hold it in the desired position.

For the purpose of steering the machine the axle 37 of the wheel 20 is pivotally mounted on the vertical axis at the lower end of rack 21 and the axle 38 of the wheel 19 is pivotally mounted on a normally vertical axis at the lower end of the lever 28. Each axle 37 and 38 are provided with a forwardly extending lever 39, which are connected by a cross bar 40, the said cross bar being pivoted as at 41, on a vertical axis with the levers 39 and being pivoted horizontally at 42 to permit the required tilting of the wheel 19.

For providing steering control, for the front wheels the axle 37 has a vertical shaft 43, secured thereto and extending axially of vertical pivot of said axle 37, the said shaft 43 being squared and passed through bearings in the bracket 44, which permit rotation and longitudinal movement of the shaft. Within the bearings 44 is a worm wheel 45, which is mounted on the shaft 43 to turn therewith and is held against longitudinal movement with the movement of the shaft so that as the wheel 20 is raised and lowered, the said shaft slides through the worm wheel 45. Mounted on the bracket 44, so as to mesh with the worm wheel 45, is a worm 46, which is connected by means of a shaft 47, to a hand wheel 48, mounted in a bracket 49 adjacent the operator's seat so that the turning of the hand wheel 48 through the worm 46 and worm wheel 45 will cause the shaft 43 and consequently the wheels 19 and 20 to turn on their vertical axes for the purpose of steering the machine.

This machine is shown with two plows, but it may be constructed with any desired number. These plows which are indicated at 50 and 51 are located intermediate of the front guiding wheels and the driving wheel, the plow 50, being placed laterally from the wheel 19 sufficiently so that when the said wheel 19 travels in the furrow in contact with the inner wall thereof, it will turn a furrow of the desired width. The plow 51 is positioned from the plow 50 the usual distance and is located immediately in front of the traction wheel 12, so that the said wheel 12 travels in the bottom of the furrow made by the plow 51.

These plows are connected to the plow beams 52, which extend to the forward end of the frame and are pivoted on a horizontal axis to the shaft 53, extending crosswise of the machine. For the purpose of tilting the plows to cause them to properly enter the ground the shaft 53 and forward ends of the plow beams are made adjustable. For this purpose, the ends of the shaft 53 are connected to shoes 54, mounted to slide in vertical guideways 55, provided on the cross plate 2. A cross brace 56, which connects the forward ends of the plow beam 52, has a link 57 pivotally connected at its lower end to the cross brace. The upper end of the said line is connected to the arm of a lever 58, which is mounted on a shaft 59, journaled in bearing 60 on the side members 1. The shaft 59 projects beyond the sill 1, at one side of the machine and has the lever 61, attached thereto, the free end of said lever being connected by means of the rod 62, to the hand lever 63, at the rear of the machine in convenient reach of the operator. This lever has a latch 64, coöperating with a segment 65, whereby the lever may be adjusted and locked in various positions for raising and lowering the forward ends of the plow beams 52 and holding them in desired position of elevation.

For the raising and lowering of the plows there is provided a vertical rack for each plow beam which is pivotally connected thereto as at 67, and extends through a vertical guideway 68, on the frame of the machine, the said guideway and rack being of sufficient length and strength to hold the plows against lateral displacement as they are passed through the ground. This is further accomplished by cross braces 69, which combine the plow beams into a unitary structure. These racks 66, slide freely through the guideway 68, so that they may be removed when it is desired to detach the plows and there is a cross shaft 70, immediately in front of the racks 66, suitably journaled in bearings 71, on the guideway 68. This shaft has a pinion 72 immediately in front of and in mesh with each rack 66, whereby the racks may be raised and lowered and there is a bevel gear 73, on the end of the shaft 70, meshing with a bevel pinion, 74, at the forward end of the shaft 75, which is suitably journaled in bearings on the frame. At the rear end of the shaft 75 is a hand wheel 76, within convenient reach of the operator, whereby the racks 66 and plows may be vertically adjusted, such adjustment being sufficient to remove the plows entirely from the ground or to cause them to engage the ground at the required depth.

When the machine is traveling over level ground, the wheel 19 is adjusted by means of the lever 31, in an upright position and the wheel 20 is adjusted to be in a horizontal plane with the wheel 19. In the operation of plowing, however, the wheel 20 is raised so that as the wheel 19 travels in the furrow, the frame of the machine will be maintained in a level position. The engagement of the plows with the ground has a tendency to swing the machine to the left, which movement however, is prevented by engagement of the traction wheel 12, with the new furrow and the engagement of the wheel 19 with the old furrow. To facilitate operation of the wheel 19, against the walls of the furrow, and to prevent the wheel from climbing out of the furrow, it is tilted or adjusted at the desired angle to accomplish this purpose.

In the operating of the machine, the front wheels are adjusted by means of a steering wheel 48 parallel with the furrow or if necessary headed in slightly toward the inner wall of the furrow so that the wheel tends to travel in close contact with the inner wall of the furrow. When so positioned the machine, on account of the lateral tendency given thereto by the passing of the plows through the ground, on account of the traction wheel 12, traveling in the furrow and on account of the adjustment of the wheel 19 automatically follow the old furrow previously made without continued attention or steering by the operator and will be thereby caused to cut the new furrows at a uniform distance from the old furrows.

I claim—

1. In a plow, the combination of a frame, a supporting wheel mounted on the frame, a pair of steering wheels mounted on opposite sides of the frame at a distance from the supporting wheel and provided with mechanism for changing the direction of the wheels for steering the machine, and adjustable means for tilting one of said steering wheels on a horizontal axis at an angle to the other of said steering wheels, whereby the lead of the steering wheel may be adjusted to take up inequalities in the line of draft during travel of the plow.

2. In a plow, the combination of a frame, a supporting wheel for supporting the frame, a pair of steering wheels mounted on opposite sides of the frame at a distance from the drive wheel, each of said wheels being pivotally supported on an upright axis, mechanism for simultaneously adjusting the said wheels on their upright axis for steering the machine, means for raising and lowering one of said wheels, and means for tilting one of said wheels on a horizontal axis at an angular relation to the other of said wheels, whereby the lead of the steering wheel may be adjusted to take up inequalities in the line of draft during travel of the plow.

3. In a plow, the combination of a frame, a single supporting wheel mounted in the frame, a pair of steering wheels at opposite sides of the frame connected together and adapted to be simultaneously operated for guiding the frame, a vertically movable support for one steering wheel, a pivotal support for the other steering wheel having its axis longitudinal of the frame, manual means for adjusting the pivoted steering wheel to vary the lead thereof during travel of the plow, and manual means for vertically adjusting the first steering wheel, to maintain the frame horizontal at all times.

4. In a plow, the combination of a main frame, a supporting wheel mounted on the frame, a pair of opposed steering wheels mounted on the frame, mechanism for changing direction of travel of the wheels, adjusting means for tilting one of said steering wheels on a horizontal axis at an angle to the other of said steering wheels to vary the lead of the tilting wheel to meet varying inequalities in the line of draft, and a plow carried by the frame spaced transversely a distance from the tiltable steering wheel equal to the distance between the furrows.

5. In a plow, the combination of a frame, a supporting wheel mounted on the frame, a pair of opposed steering wheels mounted on the frame in advance of the drive wheel, one of said wheels constituting a land and the other steering wheel a furrow wheel, a horizontal pivotal support for the furrow wheel, means for steering said wheels, means for tilting one of said wheels relatively and with reference to the main frame, and a plow carried by the frame spaced transversely a distance from the tiltable steering wheel equal to the distance between the furrows.

6. In a plow, the combination of a frame, a supporting wheel mounted on the frame, a pair of opposed supporting and steering wheels connected with the frame, means for turning said wheels for steering purposes, means for tilting one of said steering wheels on a horizontal axis at an angle to the other of said steering wheels, and a plow carried by the frame spaced transversely from the tiltable steering wheel a distance equal to the spacing of the furrows.

7. In a plow, the combination of the frame, a supporting wheel mounted on the frame, a pair of opposed supporting and steering wheels connected with the frame, means for turning said wheels for steering purposes, means for tilting one of said steering wheels on a horizontal axis at an angle to the other of said steering wheels, plows, and means for supporting the plows in transversely spaced apart relation from each other and from the tiltable steering wheel for disposing said steering wheel in the furrow.

8. In a plow, in combination, a frame, a supporting wheel mounted in the frame, a pair of opposed wheels, independent supporting axles for said wheels relatively adjustable for parallelism and non-parallelism, means connecting said wheels to facilitate their being turned in unison and at corresponding angles, means operable from the rear of the frame for causing said wheels to be turned, means connecting one of said wheels with said frame to facilitate relative vertical adjustment, means connecting the other of said wheels with the frame to facilitate the tilting of the former at various angles with relation to the latter, plows, and means for supporting said plows on the frame in relation to the tilting steering wheel to admit the travel of the latter in the furrows.

9. In a plow, the combination of a frame, means for supporting one end of the frame, opposed steering wheels arranged at the other end of the frame, pivotal means connecting one of the wheels to the frame and adapted to be adjusted for inclining the wheel to conform to the inclination of the surface in the bottom, a furrow, vertically adjustable means for connecting the other wheel to the frame for maintaining the frame in a horizontal position at all times, steering mechanism connected to both wheels for simultaneously turning the same and a plow carried in the frame.

In testimony whereof I affix my signature in presence of two witnesses.

WILLIAM A. GILFILLAN.

Witnesses:
 Eva McCready,
 W. V. Tefft.